Patented June 29, 1954

2,682,548

UNITED STATES PATENT OFFICE 2,682,548

$\Delta^5$-ANDROSTENE-3$\beta$,17$\alpha$-DIOL-16-ONE ETHERS

Max N. Huffman, Oklahoma City, Okla., assignor to G. D. Searle & Co., Chicago, Ill., a corporation of Illinois No Drawing. Application December 29, 1951, Serial No. 264,247

3 Claims. (Cl. 260—397.4)

This invention relates to compounds of the cyclopentanopolyhydrophenanthrene series and processes for manufacturing the same. More particularly, it relates to the partial synthesis of the 3,16,17-triol derivatives of the estrogen and androgen series of compounds and to the new intermediates which are produced in the synthesis.

This application is a continuation-in-part of my copending application Serial No. 34,144, filed June 19, 1948, now Patent No. 2,584,271, dated February 5, 1952.

The products of this invention have certain physiological activity and they may be used primarily to supplement the androgenic hormones naturally produced in the human body. Because of the possibility of activating various positions of the steroid nucleus and providing various functional groups on those activated positions, it is conceivable that new compounds unlike the natural occurring hormones may be synthesized and used internally to impart physiological activity of a desired and predetermined character. Compounds of the type produced by my invention may also be used as chemical intermediates for the production of other cyclopentanopolyhydrophenanthrene derivatives.

It is an object of this invention to effect the partial synthesis of estriol, androstenetriol, and other 3,16,17-triols of the estrogen and androgen series and to provide a method for producing the same.

Another object of this invention is to produce and to provide a method for manufacturing the $\alpha$-ketols of 3,17-diol derivatives of the estrogen and androgen series of compounds including the corresponding 3-alkyl ethers, such as $\Delta^5$-androstene-3($\beta$),17($\alpha$)-diol-16-one-3-alkyl ether in which the alkyl group may be methyl, ethyl, propyl, benzyl, and the like; the 16,17-dihydroxy derivatives of the estrogen and androgen series of compounds including estriol, isoestriol-A, the Hirschmann triol, and the like; the derivatives of 16,17-dihydroxy estrogen and androgen series of compounds including the cyclic acetal of isoestriol-A, isoestriol acetonides; and the alkyl ethers of the 16,17-dihydroxy estrogen and androgen series of compounds, such as $\Delta^5$-androstene-3($\beta$),16($\beta$),17($\alpha$)-triol-3-alkyl ethers including $\Delta^5$-3($\beta$),16($\beta$),17($\alpha$)-triol-3-methyl ether and other derivative ethers in which aliphatic, aromatic, and mixed aliphatic-aromatic groups are substituted for methyl.

A further object is to provide a method for converting 16-oximino steroid derivatives, such as compounds of the estrogen and androgen series having a functional oxygen containing group on the $C_3$ and $C_{17}$ positions, to the corresponding $\alpha$-ketols (vicinal ketols) or 16,17-ketols by a reduction process; converting the estrogen and androgen series of compounds having at least one ketone group in the 16 and 17 positions and a hydroxy group in the other if only one of the positions is ketone to the corresponding 16,17-dihydroxy derivatives by a reduction process which does not give rise in large proportions to a 16,17 configuration differing from that of the natural occurring estriol; separating the cisoid and transoid 16,17-dihydroxy derivatives of the estrogen and androgen series of compounds; and the dealkylation of the 16,17-dihydroxy-3-alkyl ethers of the estrogen and androgen series of compounds and the conversion thereof to the corresponding triols.

By the term "cyclopentanopolyhydrophenanthrene compounds", as used herein, it is meant the group of substances based upon the following nucleus,

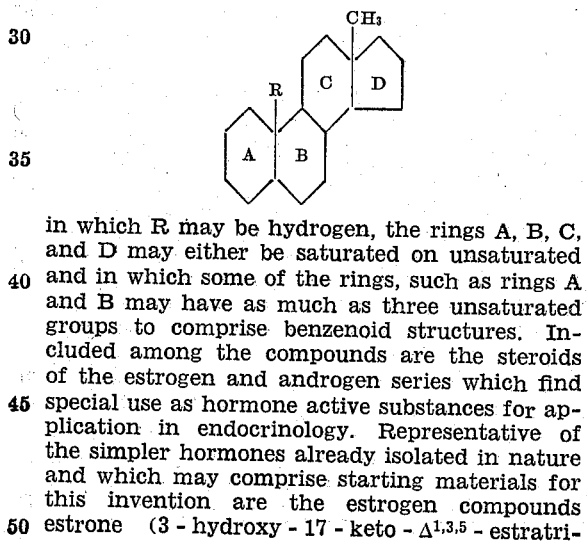

in which R may be hydrogen, the rings A, B, C, and D may either be saturated on unsaturated and in which some of the rings, such as rings A and B may have as much as three unsaturated groups to comprise benzenoid structures. Included among the compounds are the steroids of the estrogen and androgen series which find special use as hormone active substances for application in endocrinology. Representative of the simpler hormones already isolated in nature and which may comprise starting materials for this invention are the estrogen compounds estrone (3 - hydroxy - 17 - keto - $\Delta^{1,3,5}$ - estratriene), equilenin (3-hydroxy-17-keto-$\Delta^{1,3,5,6,8}$-estrapentaene), equilin (3-hydroxy-17-keto-$\Delta^{1,3,5,7}$-estratetraene), and androgen compounds androsterone (3($\alpha$)-hydroxy-17-keto-androstane), dehydroisoandrosterone (3($\beta$)-hydroxy-17-keto-$\Delta^5$-etioallocholene), and androstenedione (3,17-diketo-etioallocholene).

In accordance with this invention, I may start with any of the compounds of the type named above having a ketone group in the functional $C_{17}$ position. The $C_3$ position may be allowed to remain hydroxy, but it is better to replace the hydroxyl by a group which is later reconvertible into hydroxyl. Representative of such replacement groups are the alkyl ethers in which the alkyl group is interpreted to include methyl, ethyl, propyl, and the like aliphatics, benzyl, naphthyl, and the like aromatics or mixtures thereof and derivatives thereof. Although my invention may be practiced by starting with one of the original materials described, inventive features of my invention commence by the reaction with the 16-oximino derivative of the corresponding steroid.

In the steps by which one of the compounds named above, such as estrone, is converted to the corresponding 16-oximino derivative, the 3-hydroxy group may be etherified, that is, methylated by the process described by Butenandt, Stormer, and Westphal, "Z. Physiol. Chem.," 208 (1932). The corresponding 3-alkyl ether may then be nitrosated to give the 16-oximino derivative by the process of Litvan and Robinson, "Journal of the Chemical Society," page 1997 (1938).

In carrying out my invention, the 16-oximino derivative of the corresponding steroid is carried through a reduction reaction by which the vicinal $\alpha$-ketol derivative is produced. The $\alpha$-ketol in crude or purified form is then subjected to another reduction reaction to produce the $\alpha$-glycol derivative hereinafter referred to as the corresponding 16,17-dihydroxy steroid. This includes 16,17-dihydroxy steroids in which the 3 position is either hydroxy or otherwise modified, such as by an alkyl ether group. This last reduction step ordinarily results in the production of two isomeric glycols; namely, the transoid 16($\beta$),17($\alpha$)-dihydroxy steroid and the cisoid 16($\alpha$),17($\alpha$)-dihydroxy steroid. If desired, these may then be separated. I have conceived two processes by which these isomers may be separated. One includes a fractional crystallization process from solvent solution. The other requires a reaction of the isomeric mixture with a substance which forms the derivative of only one enabling it to be separated from the other by such means as selective solvency. Each of the compounds resulting from the latter process may be reconverted to their original 16,17-dihydroxy form. When the active $C_3$ position has been protected by an ether group, the $\alpha$-glycol may be dealkylated to produce the corresponding triol.

The 16-oximino or isonitroso steroid may be reduced to the corresponding $\alpha$-ketol by the Stodola reduction, Stodola, Kendall, and McKenzie, "Journal of Organic Chemistry," 6, 841 (1941). Briefly described, the process includes the reaction of the 16-oximino steroid derivative with zinc dust in the presence of an organic acid, such as acetic acid, which may or may not be diluted with water. Upon evaporation of the separated liquid phase, a crystalline $\alpha$-ketol is produced which may be used as is, such as in the subsequent production of the corresponding triol, or the product may be purified by extraction with solvent, such as an ether in dilute alkali solution. The ether phase may be washed by one or more of the compositions including dilute mineral acids, such as hydrochloric acid, dilute alkali metal bicarbonates, such as sodium bicarbonate, or water.

It is by this method that I have succeeded in producing compounds such as $\Delta^5$-androstene-3($\beta$),17($\alpha$)-diol-16-one and $\Delta^5$-androstene-3($\beta$),17($\alpha$)-diol-16-one-3-alkyl ethers, such as the 3-methyl ether, 3-ethyl ether, 3-benzyl ether, and the like. To the best of my knowledge, these alkyl ethers have not heretofore been produced by natural glandular secretion or by synthetic processes.

A salient feature of this invention resides in the use of a metal amalgam to effect the reduction of the $\alpha$-ketol to the corresponding 16,17-dihydroxy steroid which may be a triol if $C_3$ is hydroxyl or a glycol if the $C_3$ position is otherwise modified, such as by an alkyl ether. When the reduction from the $\alpha$-ketol is carried out by hydrogen in the presence of a catalyst, the product is undesirable because it consists essentially of isomers of a 16,17 configuration which differs from that of the natural occurring triols, such as estriol. Excellent yield of 16,17-dihydroxy steroids of the desired character is secured when the reduction is carried out with a metal amalgam, preferably in the presence of a hydrogen donor and at a temperature below 50° C. As the metal amalgam, I make use of mercury in combination with one of the base metals, such as sodium, zinc, magnesium, and the like. In the reaction, an excess of the metal amalgam at relatively low concentration, such as about 2 per cent, is used. Suitable hydrogen donors for use in the above reaction include inorganic or organic acids, bases, and neutral molecules of the type water and alcohol. As the hydrogen donor, I prefer to use a substance in which the steroid derivative is soluble. One such composition from which I have obtained excellent yield consists essentially of alcoholic acetic acid and freshly prepared sodium amalgam of about 2 per cent concentration. Excellent yields of the desired glycols are secured when the reduction reaction is carried out at a temperature of about 40–41° C. or less. When higher temperatures are used, and especially when temperatures in excess of 50° C. are used, lower yields of the desired transoid derivative are secured.

Refinement of the 16,17-dihydroxy steroid resulting from the reduction process may be effected by extracting the reaction product with water and a suitable water immiscible solvent in which the steroid derivative is soluble, such as most of the higher molecular weight liquid alcohols, including butanol and the like, esters, such as ethyl acetate, amyl acetate, and the like, and ethers, such as ethyl ether, propyl ether, etc. A suitable solvent system, for example, comprises water and ethyl ether. The separated ethereal phase may be subsequently extracted with water and/or dilute alkali solutions, such as a sodium hydroxide solution, before evaporation of the ether to crystallize the resultant 16,17-dihydroxy steroid derivatives.

Another feature of this invention resides in the novel methods by which the two isomers of 16,17-dihydroxy steroids, that is, the cisoid and transoid isomeric substances, may be separated one from another. A mixture of these isomers is usually produced by the described metal amalgam reduction. One isomer which is produced in greater proportion when the reduction reaction temperature is held below 50° C. is the transoid 16(β),17(α)-dihydroxy steroid. The other less desirable is the cisoid 16(α),17(α)-dihydroxy steroid.

I have found that the transoid may be rather completely separated from the cisoid form by the process of fractional crystallization from solvent solution, especially when the 3 position is alkylated. Because the transoid is less soluble than the cisoid in non-polar or relatively non-polar solvents, it may be separated from the cisoid by one or more recrystallizations from non-polar solvent systems. The ordinary hydrocarbons, such as the petroleum distillates, coal tar distillates, including petroleum ethers, cyclohexane, toluene, benzene, butane, and other aliphatic and alicyclic solvents, and the like are examples of non-polar solvents. Ordinarily, an organic liquid compatible with the non-polar solvent and in which the steroid derivative is soluble is incorporated into the solvent system to control the degree of solvation. I may make use of alcohols, ketones, ethers, dioxanes, and the like for the latter component. I prefer to use a solvent component which has a lower boiling point or greater volatility than the non-polar constituent of the solvent system to enable partial removal thereof from the solvent system when desired. One suitable solvent system with which I have obtained excellent results makes use of acetone and cyclohexane.

When the 3 position is unalkylated, or phenolic, the transoid form may be separated, by another method, from the cisoid form by subjecting the mixture to an acetal forming medium to form the cyclic acetal of the corresponding cisoid 16(α),17(α)-dihydroxy steroid. The transoid derivative which is substantially unreacted by the acetal forming medium may then be separated from the cisoid cyclic acetal by ordinary selective solvent means. A single solvent system may be used in which the tolerances for the cisoid acetal and the transoid glycol are of a different order enabling separation by fractional crystallization. A two component solvent system may be employed in which the selective solvent principle operates to concentrate one derivative in one phase and the other derivative in the remaining phase which is separable from the first. The latter system may include an aqueous alkaline phase in which the transoid derivative concentrates and an immiscible organic solvent phase for the cisoid cyclic acetal, but in this event, it is desirable that the 3 position be phenolic. For example, when the latter system is used, the transoid form is found in high concentration in the solvent component containing an aqueous base solution, such as a dilute sodium hydroxide, potassium hydroxide solution, and the like. The alkaline phase, which is separable from the solvent phase, may be extracted with a solvent for the cyclic acetal to extract any traces thereof. The aqueous hydroxide phase may then be acidified to produce the corresponding triol. The solvent phase may be a solvent immiscible with the aqueous alkaline solution and in which the cisoid cyclic acetal is soluble. Representative of such solvents are the chlorinated solvents, ethers, ketones, and some of the aromatics. Chloroform, ether, ethyl acetate, and ethylene dichloride are specific examples. The glycol may be regenerated by hydrolyzation of the cylic acetal.

As the acetal forming medium, ketones and aldehydes capable of reaction in the presence of a catalyst, such as an acid, to effect the acetal reaction may be used. Acetone, methyl ethyl ketone, and other ketonic solvents or other ketones represent suitable acetal forming compounds; aldehydes, such as butyraldehyde, glyoxal, pyruvic aldehyde, and aldehydic solvents, such as benzaldehyde, may be used. Inorganic acids, represented by anhydrous hydrochloric acid or other halogenic acids, comprise catalysts for the acetal reaction. I have secured excellent results by the use of an acetal forming system consisting of acetone, only a small portion of which is first saturated with anhydrous hydrogen chloride.

It is by the described method that I have succeeded for the first time in producing the cyclic acetal of isoestriol-A, such as isoestriol-A-acetonide, and other isotriol-A-acetonides of the estrogen and androgen series of compounds.

It is by these methods that I have succeeded for the first time in preparing and isolating the 3-alkyl ethers of $\Delta^5$-androstene-3(β),16(β),17(α)-triol including the 3-methyl ether, the 3-ethyl ether, the 3-benzyl ether, and the like.

As previously pointed out, the α-glycols, such as the reaction products of the metal amalgam reduction, may be constituted with an alkoxyl group, such as methoxyl, at $C_3$. When desired, conversion to the corresponding triol may be effected by a simple de-etherification, such as by hydrolysis. When the $C_3$ position may be either (α) or (β), as in the androstane series of compounds, demethylation or dealkylation presents a very difficult problem.

I have discovered a very novel reaction by which the methyl group may be easily and smoothly replaced in quantitative yield by a group readily convertible to hydroxyl. I first form the diacetate by reaction of the glycol with acetic acid or acetic anhydride; then I react the diacetate with p-toluenesulfonic acid in the presence of acetic anhydride to substitute acetyl for the methyl group at $C_3$. The resulting demethylated steroid may be saponified in solvent solution by an alkali metal base and from which the triol may be regenerated by simple hydrolysis in acid medium.

By way of illustration but not by way of limitation, the following examples are given to illustrate the invention.

EXAMPLE 1

*The conversion of estrone (I) to estrone-3-methyl ether (II)*

The methylation of estrone may be carried out by the process of Butenandt, Stormer, and Westphal, as previously pointed out.

EXAMPLE 2

*The conversion of estrone methyl ether (II) to 16-oximino estrone-3-methyl ether (III)*

This nitrosation reaction may be carried out according to the process described by Litvan and Robinson, "Journal Of The Chemical Society," page 1997 (1938).

EXAMPLE 3

*The reduction of 16-oximino-estrone-3-methyl ether (III) to 16-keto-17-hydroxy estratrienol-3-methyl ether (IV)*

To 279 mg. of 16-oximinoestrone-3-methyl ether covered with 10.0 cc. of acetic acid plus 0.6 cc. of water, was added 0.80 gm. of zinc dust, and the resulting mixture was swirled in a bath maintained at 45° C. until solution of the steroid derivative was complete. Then 9.4 cc. of water were added and the solution refluxed for 1 hour 10 minutes and cooled to room temperature. The aqueous acetic acid solution was decanted from the zinc, and the latter washed with 100 cc. of benzene. To the combined aqueous acetic acid-benzene solutions were added 80 cc. of 1.5 N sodium hydroxide and 200 cc. of ethyl ether. After having been partitioned and separated, the organic phase was washed successively with 0.5 N hydrochloric acid, with 5 per cent sodium bicarbonate, and with water. Evaporation of the ethereal solution yielded a crystalline product which, after treatment with charcoal, was recrystallized once from cyclohexane and once from aqueous ethanol to give 207 mg. of needles melting at 164–165° C. Another treatment with charcoal and recrystallization from aqueous acetone raised the melting point to 167–168° C. (203 mg.). The latter purification step may be dispensed with in the event that the crude reduction product is siutable for use or for further reaction as desired.

EXAMPLE 4

Reduction of 16-keto-17($\alpha$)-hydroxy estratrienol-3-methyl ether (IV) to 16,17-dihydroxy estratrienol-3-methyl ether (V)

A solution of 800 mg. of the $\alpha$-ketol methyl ether in 100 cc. of ethanol and 10 cc. of acetic acid was carefully maintained at 40° C. (water bath), and 200 gm. of freshly prepared sodium amalgam (2 per cent) were added in small pieces with efficient swirling. Before all of the amalgam had been added, a precipitation of sodium acetate occurred, and at this point an additional 10 cc. of 50 per cent acetic acid were added. After all the reducing agent had been added, the mixture was transferred to a separatory funnel with ether and water. The mercury plus aqueous phase was separated, after partitioning, from the ether; the latter may be further washed with water, with 0.5 N sodium hydroxide, and again with water to purify the $\alpha$-glycol. Evaporation of the ethereal phase yielded a crystalline residue of the isomeric transoid 16($\beta$),17($\alpha$)-dihydroxy-steroid-3-methyl ether and cisoid 16($\alpha$), 17($\alpha$)-dihydroxy-steroid-3-methyl ether.

EXAMPLE 5

Separation of the cisoid from the transoid 16,17 glycols of steroid-3-methyl ether (V) by fractional crystallization Separation was effected by fractional crystallization from non-polar solvents system in which the transoid derivative was less soluble than the cisoid. To this end, the mixed $\alpha$-glycols were recrystallized twice from acetone-petroleum ether. In actual practice, I dissolve the mixture of isomers in acetone and then add about 2 volumes of the non-polar petroleum ether. Since the acetone has a greater volatility than the petroleum ether, the former leaves the solution and at the point where crystallization is initiated, further evaporation is stopped and crystallization, such as by cooling, causes the desired separation.

EXAMPLE 6

Demethylation of estriol-3-methyl ether (V) to produce estriol (VIII)

To a solution of 155 mg. of estriol-3-methyl ether in 3 cc. of pyridine were added 3 cc. of acetic anhydride; the phases were mixed well and left 48 hours at room temperature. The diacetate was then precipitated at the addition of cold water, and, after having been allowed to stand several hours, filtered, washed well with water, and dried in vacuo.

The dry diacetate was then dissolved in 5 cc. of warm acetic acid, 5 cc. of freshly distilled hydriodic acid (specific gravity 1.7) were added, and the solution of diacetate methyl ether refluxed at once over a free flame. After exactly 5 minutes refluxing 100 cc. of cold aqueous sodium bisulfite were added and the resulting phases mixed well. After precipitation had become complete (ice box), the crystalline steriod was filtered, washed with aqueous sodium bisulfite, and then washed well with water. The residue was dried in vacuo.

The demethylated estrogen was then dissolved in 25 cc. of ethanol (room temperature) and a small spatula end of sodium hydrosulfite added. To the alcoholic solution were next added, for purpose of saponification, 25 cc. of 1 N sodium hydroxide, and the latter was mixed with rapid swirling. The resulting solution at first became colored a deep yellow but soon turned almost colorless. After 24 hours saponifications at room temperature, the ethanolic alkali was added to 250 cc. of 5 per cent sodium bisulfite containing 2.1 cc. of concentrated hydrochloric acid, and the resulting voluminous precipitate extracted with 500 cc. of ethyl ether. The ether, after having been partitioned and separated from the aqueous phase, was washed once with 250 cc. of 5 per cent sodium bisulfite, twice with 200 cc. portions of 0.5 N sodium hydroxide. The combined sodium hydroxide phases (400 cc. of 0.5 N) were acidified with concentrated hydrochloric acid and extracted with 500 cc. of ethyl ether. This ether, after separation from the aqueous acid phase, may be further washed with bicarbonate and with water; a crystalline residue of estriol resulted on its evaporation. The crystalline residue (after treatment with charcoal) may be recrystallized once from aqueous ethanol to give estriol.

EXAMPLE 7

Reduction of 16-oximinodehydro[isoandrosterone]-3-methyl ether (IX) to $\Delta^5$-[androstene]-3($\beta$),17($\alpha$)-diol-16-one-3-methyl ether (X)

To 500 mg. of 16-oximinodehydroisoandrosterone-3-methyl ether were added 34 cc. of 50 per cent acetic acid and 1.4 gm. of zinc dust. The mixture was refluxed for 1 hour and the hot solution decanted from the zinc into 175 cc. of water. The zinc was rinsed twice with 4 cc portions of acetic acid and these united with the main reaction solution in water which was subsequently partitioned with 200 cc. of ethyl ether; the latter, after separation, was washed with 0.5 N hydrochloric acid, with 1.0 N sodium hydroxide, and with water. Evaporation of the ethereal phase yielded a white crystalline product, $\Delta^5$-androstene-3($\beta$),17($\alpha$)-diol-16-one-3-methyl ether.

EXAMPLE 8

Reduction of $\Delta^5$-androstene-3($\beta$),17($\alpha$)-diol-16-one-3-methyl ether (X) to $\Delta^5$-androstene-3($\beta$),16($\beta$),17($\alpha$)-triol-3-methyl ether (XI) by sodium amalgam To the solution of the $\alpha$-ketol, of Example 7, in 58 cc. of ethanol and 6.5 cc. of acetic acid were gradually added 125 gm. of 2 per cent sodium amalgam, the temperature being carefully maintained at 40.0–40.5° C. by continuous swirling in a water bath. (As soon as sodium acetate commenced to precipitate, 5.0 cc. of 50 per cent acetic acid were added.) When the reaction had been completed, the mixture of mercury and solution was diluted with water and extracted with ethyl ether. After removal of the mercury and aqueous phases, the ether may be further washed with water, with 0.5 N sodium hydroxide, and again with water. Evaporation of the ether yielded a white crystalline product. After recrystallization, twice from acetone-petroleum ether and once from absolute acetone $\Delta^5$-androstene-3($\beta$),16($\beta$),-17($\alpha$)-triol-3-methyl ether crystallized as the hemihydrate in the form of tiny leaves. The cisoid derivative is to be found in the petroleum solvent.

EXAMPLE 9

*Transformation of urinary androstenetriol-3-methyl ether (XI) to the triol (XII)*

To 301 mg. of the 3-methyl ether of Hirschmann's triol (M. P. 195–196° C.) dissolved in 5 cc. of dry pyridine were added 3 cc. of acetic anhydride. The two phases were mixed well and left 24 hours with occasional swirling. The diacetate was then precipitated by treatment with 200 cc. of ice water, and finally, after 3 hours in the ice box, filtered and washed copiously with water.

To the air-dried diacetate (as above) were added 186 mg. of p-toluene-sulfonic acid monohydrate and the solid materials covered with 18.6 cc. of redistilled acetic anhydride. The mixture was heated on the steam bath with frequent stirring for exactly 30 minutes and then cooled in an ice bath. As no crystallization of triacetate had occurred within 3 hours time, the anhydride was decomposed with ice water and the steroid extracted with ethyl ether. The ether, after having been washed with aqueous sodium bicarbonate and with water, was dried and then evaporated to produce the triacetate. The resulting white residue may be recrystallized from aqueous ethanol (one time with the aid of charcoal) to yield 249 mg. of white plates, M. P. 183–185° C.

All filtrates from the recrystallizations of triol triacetate were added to ether and the ethereal solution washed several times with water. After evaporation of this ether, the resulting crystalline residue was dissolved in 25 cc. of ethanol, 25 cc. of 1.0 N potassium hydroxide were then added, and the alkaline solution refluxed for 30 minutes. Following the addition of 25 cc. of water, the saponification medium was distilled until it had become turbid. The free triol was allowed to crystallize for 2 days in the ice box and then filtered and washed well with water (100 mg., melting at 250–252° C.). This material may be recrystallized once from aqueous ethanol, once from absolute acetone, and again from aqueous ethanol to produce the triol crystallized as hexagonal plates with one-half molecule of water.

EXAMPLE 10

*The sodium amalgam reduction of 16-keto-$\alpha$-estradiol (XIII) to estriol (VIII)*

To a solution of 0.44 g. of 16-keto-$\alpha$-estradiol in 50 cc. of 95 per cent ethanol plus 5 cc. of acetic acid were gradually added 100 g. of 2 per cent sodium amalgam, with the application of continuous and efficient mixing. The temperature of the reaction bath was carefully maintained at 40.0–40.5° C. As soon as sodium acetate commenced to precipitate from the reaction mixture, 5 cc. of 50 per cent acetic acid was added. The supernatant fluid was decanted from the mercury (whenever the reaction is ended) and to it was added 50 cc. of water. From this mixture, the alcohol was largely removed by distillation, and the water-rich phase further diluted with 50 cc. of water. After a day in the ice box, the isomeric glycols were filtered and dried. Any remaining ketonic material was removed from the glycol mixture by the use of Girard's reagent or carboxy-methoxylamine in the usual fashion.

EXAMPLE 11

*The separation of the cisoid and transoid isomers of estriol*

The non-ketonic product of Example 10 was dissolved in 35 cc. of acetone at room temperature and 5 cc. of acetone saturated with anhydrous hydrogen chloride was added. This acetal forming medium was swirled for 5 minutes or longer and then added to 50 cc. of aqueous potassium carbonate (containing 1.50 g. of $K_2CO_3$), mixed at once, and then further diluted to a volume of 400 cc. with water. After a day in the ice box, the precipated material was filtered, washed with water containing a trace of pyridine, and then dried in vacuo. The dried residue, containing the cisoid form as the acetal, was then dissolved in 300 cc. of chloroform and partitioned with 300 cc. of 0.1 N sodium hydroxide. The alkaline phase, containing the transoid form as the alkali metal hydrate, was separated and again washed with 300 cc. of chloroform. The sodium hydroxide phase was then acidified with hydrochloric acid and extracted with ethyl ether. Evaporation of the ethereal phase yielded estriol, which may be recrystallized to any stage of purity desired. From the combined chloroform washings containing the cyclic acetal of the cisoid derivative may be obtained isoestriol-A acetonide (XIV) (M. P. 183.5–184.5° C.). Mild hydrolysis of isoestriol-A acetonide gives pure isoestriol-A.

EXAMPLE 12

*The reduction of 16-keto-$\alpha$-estradiol (XIII) to estriol by magnesium amalgam*

To a solution of 485 mg. of 16-keto-$\alpha$-estradiol in 50 cc. of ethanol cooled in an ice-water bath was added 76 g. of magnesium amalgam (4 g. Mg:72 g. Hg), then gradually over the course of 1 hour was added 20 cc. of aqueous acetic acid (45 parts HOAc:13.5 parts $H_2O$) in 1 cc. portions. Temperature was not allowed to exceed 50° C. After the reaction was ended, the mixture was transferred to a separatory funnel using 800 cc. dilute hydrochloric acid and 800 cc. of ethyl ether. After having been partitioned, the ether was separated and washed again with dilute hydrochloric acid and with water. Evaporation of the ether yielded estriol. This may be further treated by the processes of Examples 11 or 5 to separate estriol from isoestriol-A.

The reactions may be illustrated by the following formulae which show the various transformations described.

It will be understood that many changes and variations in materials, concentrations, and conditions may be made by those skilled in the art in accordance with the principles set forth without departing from the spirit of the invention as claimed.

The stereochemical designations at positions 16 and 17 employed in this application and in the parent application Serial No. 34,144, filed June 19, 1948, now Patent No. 2,584,271, dated February 5, 1952, conform to the terminology used in Gilman, "Organic Chemistry," second edition, 1943, volume II, chapter 19, John Wiley and Sons, Inc., New York, N. Y., and by Huffman and Lott, J. Am. Chem. Soc., 71, 719 (1949).

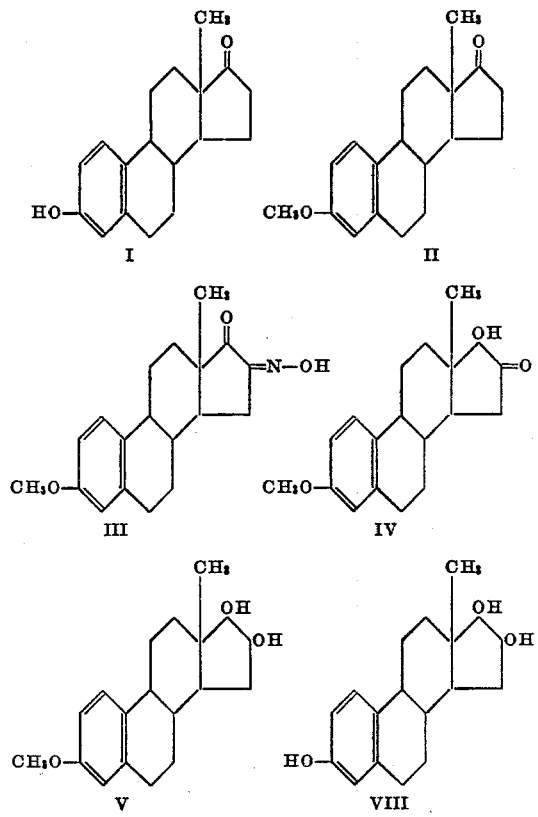

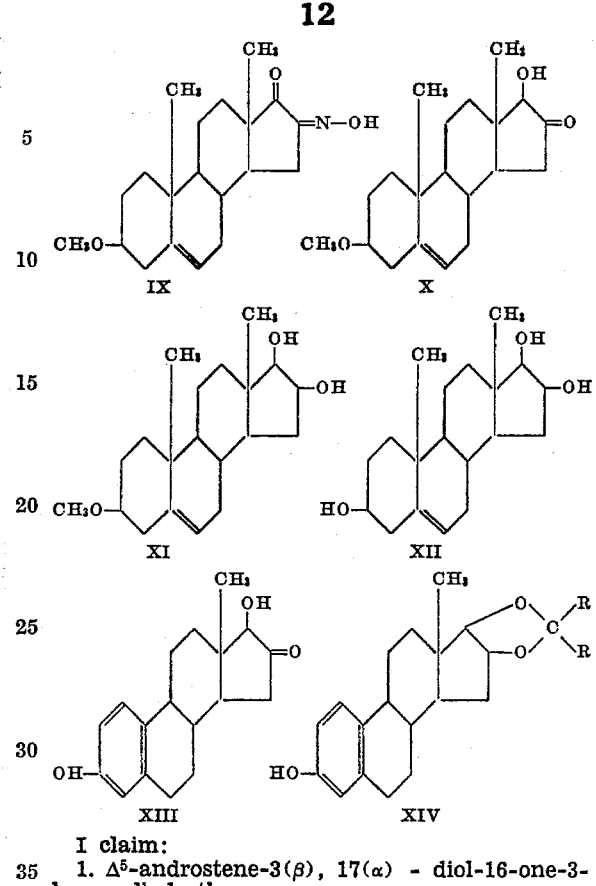

I claim:
1. Δ⁵-androstene-3(β), 17(α) - diol-16-one-3-lower alkyl ether.
2. Δ⁵-androstene-3(β), 17(α) - diol-16-one-3-methyl ether.
3. Δ⁵-androstene-3(β), 17(α) - diol-16-one-3-benzyl ether.

References Cited in the file of this patent

Huffman et al., Jour. Biol. Chem. 172, 789–795 (1948).